Patented Nov. 21, 1939

2,180,344

UNITED STATES PATENT OFFICE 2,180,344

TERTIARY N,N-DI-CYCLOALKYL-ALKYL AMINES

Frederick F. Blicke, Ann Arbor, Mich.

No Drawing. Application June 21, 1937,
Serial No. 149,550

9 Claims. (Cl. 260—563)

This invention relates to a novel group of tertiary amines and their salts, viz., the hydrocarbon-substituted di-(cycloalkyl-alkyl) amines.

These basic compounds have the following general structural formula:

wherein Y represents an aliphatic, aromatic, or araliphatic hydrocarbon group, e. g., an alkenyl, alkyl, cycloalkyl, cycloalkyl-alkyl, aryl, or aralkyl radical; and X represents a cycloalkyl-alkyl group in which the alkyl residue is attached to the nitrogen atom. The compounds are substantially water-white, relatively viscous, high-boiling liquids, which generally have a faint, characteristic, amine-compound odor. The salts are generally white crystalline solids of varying solubility in water or organic solvents.

I have prepared several representative members of this group of compounds, determined certain of their physical properties whereby they can be identified, and have found them to be valuable for pharmaceutical purposes, certain of them being particularly effective as antispasmodics.

The general method for the preparation of my new tertiary amines comprises reacting a hydrocarbon-substituted primary amine, e. g., methyl amine, with a cycloalkyl-alkyl halide in a liquid organic solvent for the reactants which is non-reactive therewith under the conditions employed. The reaction may be carried out at room temperature and at atmospheric pressure, or the reaction mixture may be heated to moderately elevated temperatures under the vapor pressure of the reactants at such temperatures. If desired, an inorganic alkaline material such as sodium hydroxide, sodium carbonate, potassium carbonate, calcium carbonate, or the like, may be employed to promote the reaction.

After the reaction has been substantially completed, the crude reaction product is treated to separate the tertiary amine. Any of the usual methods for amine purification may be employed, depending upon the characteristics of the tertiary amine or the hydrohalide thereof formed during the reaction. For example, the mixed amines may be separated directly by fractional distillation under reduced pressure. The crude reaction product may be treated with acids, e. g., sulphuric acid, nitric acid, tartaric acid, citric acid, and other like acids, to form the salts of the amines therein, which can then be readily separated.

The following examples illustrate the practice of my invention, but are not to be construed as limiting the same:

EXAMPLE 1

Methyl-di-(cyclohexylmethyl)-amine

A mixture of 1.55 grams (0.5 mol) of methylamine, 17.7 grams (0.1 mol) of cyclohexylmethyl bromide, 10.6 grams of anhydrous sodium carbonate, and 60 milliliters of ethyl alcohol was heated to, and maintained at a temperature of 135°–140° C. under the vapor pressure of the reaction mixture for a period of 8 hours. The alcohol was then distilled out of the reaction product, the residue acidified with concentrated hydrochloric acid, and small portions of unreacted cyclohexylmethyl bromide recovered therefrom by extraction with diethyl ether. The aqueous solution of mixed amine hydrochlorides was then made alkaline with sodium hydroxide, whereby an oily layer separated from solution. This oil was taken up in diethyl ether, dried over anhydrous sodium sulfate, and the ether evaporated therefrom. The residue was fractionally distilled to obtain methyl-di-(cyclohexylmethyl)-amine as an oily liquid boiling at 144°–147° C. under about 11 millimeters of mercury pressure, absolute.

A portion of the above substance was redissolved in anhydrous diethyl ether, and dry hydrogen chloride bubbled therethrough whereby the hydrochloride of the tertiary amine was precipitated throughout the reaction mixture. This ether suspension was filtered and the residue recrystallized from 1,4-dioxane to obtain methyl-di-(cyclohexylmethyl)-amine hydrochloride as a white crystalline material melting at 240°–240.5° C. Analysis for chlorine: found, 13.55 per cent by weight; calculated, 13.6 per cent.

EXAMPLE 2

Methyl-di-(beta-cyclohexylethyl)-amine 6.2 grams (0.2 mol) of methylamine and 24 grams of beta-cyclohexylethyl iodide was dissolved in 100 milliliters of anhydrous benzene, and allowed to stand over a period of 6 days at room temperature. The reaction product was filtered, and the benzene solution acidified with 85 milliliters of 15 percent aqueous hydrochloric acid, whereby a white precipitate was obtained in the benzene layer. This precipitate was filtered off, suspended in water, and the suspension made alkaline. In this manner the amine was obtained as an oily layer, which oil was separated, extracted with diethyl ether, dried over sodium hydroxide, the ether evaporated, and the residue fractionally distilled to yield 7 grams of methyl-di-(beta-cyclohexylethyl)-amine boiling at 188°–193° C., under a pressure of about 23 millimeters. The hydrochloride of this compound, obtained by treating the amine with anhydrous hydrogen chloride, was found to have a melting point of 257°–258° C., after recrystallization from ethyl acetate. The yellow, crystalline product

obtained by the addition of gold chloride solution to an aqueous solution of methyl-di-(beta-cyclohexylethyl)-amine hydrochloride, melts at 166°–167° C. after recrystallization from dilute ethyl alcohol. Analysis for gold: found, 33.37 per cent by weight; calculated, 33.35 per cent.

I have also prepared this tertiary amine according to the following procedure: A mixture of 12.4 grams (0.4 mol) of methylamine, 152.8 grams (0.8 mol) of beta-cyclohexylethyl bromide, 84.8 grams (0.8 mol) of anhydrous sodium carbonate, and 60 milliliters of ethyl alcohol, was heated in an autoclave at a temperature of 145°–150° C. for about six hours. The content of the reaction vessel was then distilled to remove the alcohol, made alkaline with aqueous sodium hydroxide, the amines taken up with diethyl ether, the extract dried over sodium sulphate, and the ether evaporated. The residue was fractionally distilled to yield 23 grams of methyl-beta-cyclohexylethyl-amine and 37 grams of methyl-di-(beta-cyclohexylethyl)-amine. A portion of the tertiary base was converted to the hydrochloride, recrystallized from a mixture of acetone and alcohol, and found to have a melting point of 257°–258° C.

By way of illustrating the use of the secondary amine in the preparation of the tertiary compound, and pointing out that the secondary amine can be recycled in the process to form by further reaction the tertiary compound, the preparation of the above tertiary amine from the secondary amine obtained in a prior experiment is described: A mixture of 56.4 grams (0.4 mol) of methyl-beta-cyclohexylethyl-amine, 76.4 grams (0.4 mol) of beta-cyclohexylethyl bromide, and 42.4 grams (0.4 mol) of anhydrous sodium carbonate was heated in a flask in an oil bath maintained at a temperature of 145°–150° C., for about 20 hours. The content of the flask was cooled, made alkaline with aqueous sodium hydroxide, the amines taken up with diethyl ether, the extract dried over sodium sulphate, and fractionally distilled. In this way 12.5 grams of unreacted methyl-beta-cyclohexylethyl-amine was recovered, and 45 grams of the desired tertiary amine obtained.

EXAMPLE 3

*Methyl-di-(gamma-cyclohexyl-n-propyl)-amine*

A mixture of 13.0 grams (0.32 mol) of methylamine, 29 grams (0.14 mol) of gamma-cyclohexyl-n-propyl bromide, and 75 milliliters of anhydrous benzene was allowed to stand at room temperature for six days. The reaction mixture was then filtered to separate 10 grams of methylamine hydrobromide, and the filtrate let stand for two more days. Thereafter 50 milliliters of 20 per cent aqueous hydrochloric acid was added and the mixture shaken vigorously. The reaction mixture separated into two layers, which were parted and the benzene layer evaporated to dryness to obtain a quantity of white crystals. The crystals were washed with anhydrous ether and then suspended in 25 milliliters of water and the solution made alkaline with 10 per cent aqueous sodium hydroxide. The oily layer resulting, was separated, taken up with diethyl ether, dried over potassium hydroxide, the ether distilled, and the residue fractionated under reduced pressure to yield 7 grams of methyl-di-(gamma-cyclohexyl-n-propyl)-amine boiling at 202°–204° C. under 20 millimeters of pressure. The tertiary base was dissolved in anhydrous ether and dry hydrogen chloride passed thereinto. The reaction product was worked up to obtain methyl-di-(gamma-cyclohexyl-n-propyl)-amine hydrochloride, which, after recrystallization from ethyl acetate, was found to have a melting point of 213°–216° C. The product was found to contain 11.09 per cent by weight of chlorine which corresponds very closely to the theory of 11.23 per cent for this compound.

EXAMPLE 4

*Methyl-di-(delta-cyclohexyl-n-butyl)-amine*

A mixture of 18.6 grams (0.6 mol) of methylamine, 33 grams (0.15 mol) of delta-cyclohexyl-n-butyl bromide, and 100 milliliters of anhydrous benzene was allowed to stand at room temperature for 11 days. The reaction mixture was then filtered to recover 9.6 grams of methylamine hydrobromide, and residual traces of unreacted methylamine removed from the reaction product by repeated extraction with dilute aqueous hydrochloric acid. The benzene was then evaporated from the crude reaction product and the residue washed with anhydrous diethyl ether whereby there was obtained 17 grams of mixed secondary and tertiary amine hydrochloride crystals. This residue was dissolved in a minimum amount of water and made alkaline, whereby an oil was separated therefrom. This oil was taken up in ether, dried over anhydrous potassium hydroxide, and fractionally distilled, to yield 6 grams of a methyl-di-(delta-cyclohexyl-n-butyl)-amine product boiling at 225°–227° C. at 36.5 millimeters of mercury pressure absolute. The methyl-di-(delta-cyclohexyl-n-butyl)-amine fraction was dissolved in anhydrous diethyl ether and dry hydrogen chloride passed thereinto, whereby the desired hydrochloride product was precipitated. The reaction mixture was then filtered and the precipitate recrystallized from ethyl acetate to obtain methyl-di-(delta-cyclohexyl-n-butyl)-amine hydrochloride melting at 188°–191° C.

EXAMPLE 5

*Methyl-di-(beta-cyclopentylethyl)-amine*

The methylamine generated from 36.5 grams (0.18 mol) of methylamine hydrochloride was collected in 100 milliliters of dry benzene, and 33 grams (0.18 mol) of beta-cyclopentylethyl bromide added to the benzene solution. The reaction mixture was allowed to stand at room temperature for five days, after which it was filtered to remove 12 grams of methylamine hydrobromide. The filtrate was then heated in a flask in an oil bath maintained at a temperature of 55°–60° C., for 24 hours, cooled, and filtered to remove 3.3 grams of methylamine hydrobromide crystals. The filtrate was acidified with 75 milliliters of 17 per cent hydrochloric acid solution, shaken thoroughly, and the oily layer formed between the water and benzene layers was separated. This oily layer was then suspended in 50 milliliters of water and the mixture made alkaline. The oil separating from the aqueous alkali was removed, dried over potassium hydroxide, and distilled under reduced pressure to obtain methyl-di-(beta-cyclopentylethyl)-amine.

The tertiary amine was dissolved in diethyl ether, dry hydrogen chloride bubbled thereinto, and the amine hydrochloride thereby formed was filtered off as a white crystalline substance. The hydrochloride was washed with acetone, recrystallized from ethyl acetate, and found to have a melting point of 240°–242° C. Analysis for chlorine ($C_{15}H_{30}NCl$): found, 13.64 per cent by weight; calculated, 13.66 per cent.

EXAMPLE 6

Ethyl-di-(cyclohexylmethyl)-amine

A mixture of 2.25 grams (0.05 mol) of ethylamine, 17.7 grams (0.1 mol) of cyclohexylmethyl bromide, 10.6 grams of anhydrous sodium carbonate, and 50 milliliters of ethyl alcohol was heated to, and maintained at a temperature of 145°–150° C. under the vapor pressure of the reaction mixture for a period of 8 hours. The alcohol was distilled off from the reaction product, the residue made acid with concentrated hydrochloric acid, and the solution extracted several times with diethyl ether. The aqueous acidic layer was separated, and made alkaline with aqueous sodium hydroxide. The oily layer so obtained was taken up with diethyl ether, the extract dried over anhydrous sodium sulphate, the ether evaporated, and the residue distilled under reduced pressure to yield 3 grams of ethyl-di-(cyclohexylmethyl)-amine, boiling at 149°–153° C. under 12 millimeters of pressure.

The hydrochloride of this compound, obtained by treating the teritary base with anhydrous hydrogen chloride in a carbon tetrachloride solution, was determined to have a melting point of 137°–138° C. Chlorine analysis: found, 12.90 per cent by weight of chlorine; theory, 12.95 per cent. The compound is soluble in water.

EXAMPLE 7

Ethyl-di-(beta-cyclohexylethyl)-amine

A mixture of 9.0 grams (0.2 mol) of ethylamine, 58 grams (0.3 mol) of beta-cyclohexylethyl bromide and 100 milliliters of dry benzene was allowed to stand at room temperature for 7 days. The reaction product was then filtered to separate crystals of ethylamine bromide which had been formed. The filtrate was refluxed on a steam bath for 12 hours, cooled to room temperature, and made acid with 35 milliliters of concentrated hydrochloric acid and 25 milliliters of water added. This acidification caused an oily layer to separate from the reaction mixture, and collect between the benzene and aqueous acidic layers. The aqueous layer and the oily layer were separated from the benzene, which contains the excess beta-cyclohexylethyl bromide, the water solution made alkaline, and the oil taken up with diethyl ether. The ether extract was dried over sodium hydroxide, the ether evaporated, and the residue fractionally distilled to yield ethyl-di-(beta-cyclohexylethyl)-amine, boiling at 194°–197° C. under 21 millimeters pressure.

The tertiary base was dissolved in anhydrous ether and dry hydrogen chloride bubbled thereinto. A white precipitate was obtained, which becomes oily if excess hydrogen chloride is employed. Upon recrystallization from benzene-diethyl ether, ethyl-di-(beta-cyclohexylethyl)-amine hydrochloride, which softens a little at 128° C., melts at 130–133° C., was found to contain 11.99 per cent by weight of chlorine; theory, 11.75 per cent.

EXAMPLE 8

Ethyl-di-(delta-cyclohexyl-n-butyl)-amine

A mixture of 18.0 grams (0.4 mol) of ethylamine, 43 grams (0.2 mol) of delta-cyclohexyl-n-butyl bromide, and 100 milliliters of anhydrous benzene was allowed to stand at room temperature for 12 days. 18 grams of ethylamine hydrobromide was then removed from the reaction mixture by filtration, and the filtrate refluxed on a steam bath for 6 hours. After cooling, 50 milliliters of water and 25 milliliters of concentrated hydrochloric acid were added to the benzene solution, which mixture was then shaken vigorously and the aqueous acidic layer separated. This aqueous layer was then made alkaline, whereupon it became cloudy. The benzene layer was allowed to stand at room temperature until the benzene had evaporated, leaving behind a quantity of crystals which were washed with diethyl ether, suspended in 25 milliliters of water, and the aqueous suspension made alkaline. The oily layer which formed on the top of this solution was separated, taken up with diethyl ether, the ether extracted, dried over potassium hydroxide, and then fractionally distilled to obtain a fraction boiling at 230°–236° C. under 19 millimeters pressure, which was ethyl-di-(delta-cyclohexyl-n-butyl)-amine. The hydrochloride of this compound, after recrystallization from benzene-petroleum ether, had a melting point of 132°–135° C., and upon analysis for chlorine, gave exactly the theoretical per cent by weight of chlorine, i. e., 9.91 per cent.

EXAMPLE 9

Ethyl-(cyclohexylmethyl)-(beta-cyclohexylethyl)-amine

A mixture of 2 grams of ethyl-cyclohexylmethyl-amine, 3 grams of beta-cyclohexylethyl bromide, 3 grams of anhydrous sodium carbonate, and 25 milliliters of ethyl alcohol was refluxed on a steam bath for 50 hours. The reaction product was then acidified with concentrated hydrochloric acid and extracted with diethyl ether. The aqueous acidic solution was then made alkaline with aqueous sodium hydroxide, the oil thereby formed, taken up with diethyl ether, the ether extract dried over sodium sulphate, and the ether evaporated. The oily residue was then fractionally distilled in vacuo to yield 2.5 grams of ethyl-(cyclohexylmethyl)-(beta-cyclohexylethyl)-amine, boiling at 146°–149° C. under 5 millimeters pressure.

The tertiary base was dissolved in petroleum ether (boiling point 30°–40° C.) and a petroleum ether solution of dry hydrogen chloride gradually added thereto. The amine hydrochloride was formed as a gummy solid which hardened upon standing. The salt was dissolved in acetone and caused to crystallize therefrom by the addition of absolute diethyl ether to the solution. The hydrochloride of the amine had a melting point of 116°–117° C., chlorine analysis: found, 12.42 per cent by weight of chlorine; theory, 12.32 per cent.

EXAMPLE 10 n-Propyl-di-(beta-cyclohexylethyl)-amine

A mixture of 2.95 grams (0.05 mol) of n-propylamine, 19.1 grams (0.1 mol) of beta-cyclohexylethyl bromide, 10.6 grams of anhydrous sodium carbonate, and 25 milliliters of xylene was allowed to stand at room temperature in a closed vessel for 35 days. The reaction product was warmed on a steam bath for 1 hour, cooled, washed with dilute aqueous sodium hydroxide, extracted with diethyl ether, and the ether extract dried over sodium sulphate. The oil remaining after the ether had been evaporated was distilled to yield about 2 grams of n-propyl-di-(beta-cyclohexylethyl)-amine, boiling at 160°–165° C. under 7 millimeters pressure. The compound was analyzed for nitrogen: found, 4.96 per cent by weight thereof; theory, 5.02 per cent.

Treatment of a dry diethyl solution of the tertiary amine gave no precipitate, and treatment of the petroleum ether solution of the base with dry hydrogen chloride gave an oil which could not be crystallized.

EXAMPLE 11

*Isopropyl-di-(beta-cyclohexylethyl)-amine*

A mixture of 5.9 grams (0.1 mol) of isopropylamine, 19.1 grams (0.1 mol) of beta-cyclohexylethyl bromide, 10.6 grams of anhydrous sodium carbonate, and 25 milliliters of xylene was allowed to stand at room temperature for 35 days in a stoppered flask. The mixture was then heated on a steam bath for 1 hour, washed with dilute aqueous sodium hydroxide, extracted with diethyl ether, and the ether extract dried over sodium sulphate. The ether was then evaporated, the material so-obtained dissolved in xylene, 10.6 grams of anhydrous sodium carbonate added to the solution, and the mixture heated at 130°–135° C. for 20 hours. The reaction product was subjected to the washing, extracting, and like steps above-described, after which the oil obtained was fractionally distilled to yield 4 grams of isopropyl-di-(beta-cyclohexylethyl)-amine, boiling at 171°–174° C. under 7 millimeters pressure.

The hydrochloride of the tertiary base was obtained as an oil when hydrogen chloride was passed into a solution of the base in anhydrous diethyl ether. The hydrochloride is moderately soluble in water.

EXAMPLE 12

*n-Butyl-di-(beta-cyclohexylethyl)-amine*

A mixture of 7.3 grams (0.1 mol) of n-butylamine, 38.2 grams (0.2 mol) of beta-cyclohexylethyl bromide, 21.2 grams of anhydrous sodium carbonate, and 25 milliliters of ethyl alcohol was refluxed on a steam bath for 40 hours. The reaction product was cooled, washed with dilute aqueous sodium hydroxide, extracted with diethyl ether, and the ether evaporated to yield an oil which was fractionated under reduced pressure. 13 grams of n-butyl-di-(beta-cyclohexylethyl)-amine, boiling at 176°–178° C. under 7 millimeters of pressure was obtained.

Treatment of a solution of the tertiary base in anhydrous diethyl ether with dry hydrogen chloride produced an oil which could not be crystallized.

EXAMPLE 13

*n-Amyl-di-(beta-cyclohexylethyl)-amine*

A mixture of 4.4 grams (0.05 mol) of n-amylamine, 19.1 grams (0.1 mol) of beta-cyclohexylethyl bromide, 10.6 grams (0.1 mol) of anhydrous sodium carbonate, and 25 milliliters of xylene was heated on a steam bath for 40 hours. The reaction product was cooled, washed with dilute aqueous sodium hydroxide, extracted with diethyl ether, and the ether evaporated to yield an oil which was fractionated under reduced pressure. n-Amyl-di-(beta-cyclohexylethyl)-amine was fractionated from the residue at 178°–181° C. under 7 millimeters of pressure. The product was analyzed for nitrogen: found, 4.70 per cent by weight; theory, 4.56 per cent.

No precipitate was obtained when dry hydrogen chloride was passed into an anhydrous diethyl ether solution of the tertiary amine. Treatment of a petroleum ether solution of the tertiary base of dry hydrogen chloride yielded an oil which could not be crystallized. This oily hydrochloride of the tertiary amine forms a loose addition compound with carbon tetrachloride which will exist as white needles in liquid carbon tetrachloride or in an atmosphere of carbon tetrachloride. When such needles are exposed to air, the oily hydrochloride is regenerated.

EXAMPLE 14

*n-Heptyl-di-(beta-cyclohexylethyl)-amine*

A mixture of 5.75 grams (0.05 mol) of n-heptylamine, 19.1 grams (0.1 mol) of beta-cyclohexylethyl bromide, 10.6 grams (0.1 mol) of anhydrous sodium carbonate, and 25 milliliters of xylene was heated in a flask surrounded by an oil bath at a temperature of 145°–150° C., for 20 hours. The product was then cooled, washed with dilute sodium hydroxide, extracted with diethyl ether, and the extract dried over sodium sulphate. The ether was evaporated and the oil remaining fractionally distilled to yield 3 grams of n-heptyl-di-(beta-cyclohexylethyl)-amine, boiling at 197°–202° C. under 6 millimeters of pressure. The compound was analyzed for nitrogen: found, 4.21 per cent by weight; theory, 4.18 per cent.

Treatment of the tertiary base with dry hydrogen chloride in anhydrous diethyl ether solution produced no precipitate. Treatment with hydrogen chloride of a petroleum ether solution of the base precipitated an oil which could not be crystallized.

EXAMPLE 15

*Cyclohexyl-di-(beta-cyclohexylethyl)-amine*

A mixture of 4.95 grams (0.05 mol) of cyclohexylamine, 19.1 grams (0.1 mol) of beta-cyclohexylethyl bromide, 4.2 grams of finely powdered sodium hydroxide, and 25 milliliters of xylene was heated in a flask surrounded by an oil bath at a temperature of 125°–130° C., for 15 hours. The reaction product was cooled, a small amount of water added, and the mixture made acid with concentrated hydrochloric acid. The acidic product was filtered, and the aqueous layer in the filtrate separated from the xylene layer. The precipitate from the filtration was suspended in the separated aqueous layer, and the suspension made alkaline with aqueous sodium hydroxide. The oil so-produced was taken up with diethyl ether, the ether extract dried over sodium sulphate, and the ether evaporated. The oily residue was fractionated to yield a material boiling at 200°–225° C. under 21 millimeters of pressure. This fraction was redistilled and 3 grams of a fraction boiling at 190°–193° C. under 5 millimeters pressure obtained, which was cyclohexyl-di-(beta-cyclohexylethyl)-amine.

The hydrochloride of this amine was prepared by passing dry hydrogen chloride into an absolute diethyl ether solution of the base. After recrystallization of the hydrochloride from 1,4-dioxane, it was found to have a melting point of 165°–167° C.

EXAMPLE 16

Phenyl-di-(beta-cyclohexylethyl)-amine

A mixture of 4.7 grams (0.05 mol) of aniline, 19.1 grams (0.1 mol) of beta-cyclohexylethyl bromide, 10.6 grams (0.1 mol) of anhydrous sodium carbonate, and 25 milliliters of xylene was heated in a flask surrounded by an oil bath at a temperature of 155°–160° C., over a period of 60 hours. The reaction product was cooled, washed with a 25 per cent aqueous sodium hydroxide solution, extracted with diethylether, the ether extract dried over sodium sulphate, and the ether evaporated. The oily residue remaining was fractionally distilled to yield phenyl-di-(beta-cyclohexylethyl)-amine, boiling at 213°–218° C. under about 5 millimeters of pressure.

The hydrochloride of the tertiary base was prepared by passing dry hydrogen chloride into an anhydrous diethyl ether solution of the base. The crystals obtained were dissolved in carbon tetrachloride and precipitated therefrom by the addition of diethyl ether. These hydrochloride crystals had a melting point of 148°–150° C. Analysis of the hydrochloride for chlorine: found, 9.94 per cent by weight; theory, 10.14 per cent.

EXAMPLE 17

Benzyl-di-(beta-cyclohexylethyl)-amine

A mixture of 8 grams (0.075 mol) of benzylamine, 28.7 grams (0.15 mol) of beta-cyclohexylethyl bromide, 15.9 grams (0.15 mol) of anhydrous sodium carbonate, and 25 milliliters of n-butyl alcohol was refluxed on an oil bath, maintained at a temperature of 140° C., over a period of 20 hours. The reaction product was cooled, washed with a 25 per cent aqueous sodium hydroxide solution, extracted with diethyl ether, the ether extract dried over sodium sulphate, and the ether evaporated. The oily residue remaining was fractionally distilled to separate a fraction boiling at 205°–215° C. under 6 millimeters pressure. This fraction was redistilled to yield benzyl-di-(beta-cyclohexylethyl)-amine, boiling at 207°–210° C. under about 5 millimeters pressure.

Benzyl-di-(beta-cyclohexylethyl)-amine hydrochloride was prepared by passing dry hydrogen chloride into an absolute ether solution of the foregoing tertiary base. After recrystallization from carbon tetrachloride, the hydrochloride crystals had a melting point of 141°–143° C. Analysis of the hydrochloride for chlorine: found, 9.73 per cent by weight thereof; theory, 9.75 per cent.

EXAMPLE 18

Allyl-di-(beta-cyclohexylethyl)-amine

A mixture of 2.9 grams (0.05 mol) of allylamine, 19.1 grams (0.1 mol) of beta-cyclohexylethyl bromide, 10.6 grams (0.1 mol) of anhydrous sodium carbonate, and 25 milliliters of xylene was heated in a flask surounded by an oil bath at a temperature of 120°–125° C., over a period of 30 hours. The reaction product was cooled, washed with a 25% aqueous sodium hydroxide solution, extracted with diethyl ether, the ether extract dried over sodium sulphate, and the ether evaporated. The oily residue remaining was fractionally distilled to separate a fraction boiling at 168°–180° C. under about 7 millimeters pressure. This fraction was redistilled to yield allyl-di-(beta-cyclohexylethyl)-amine, boiling at 170°–172° C. under about 5 millimeters pressure.

Allyl-di-(beta - cyclohexylethyl) - amine was prepared by passing dry hydrogen chloride into an absolute ether solution of the foregoing tertiary base. After recrystallization from carbon tetrachloride, the hydrochloride had a melting point of 137°–138° C. Analysis of the hydrochloride for chlorine: found, 11.31 per cent by weight thereof; theory, 11.30 per cent.

Among other tertiary amine salts which are included within the scope of my invention are: methyl-di-(beta - cyclohexylethyl) - amine tartrate, ethyl-di-(delta-cyclohexyl-n-butyl)-amine citrate, isopropyl-di - (beta - cyclopentylethyl) - amine nitrate, and the sulphates, phosphates, and oxalates of any of the tertiary amines herein described.

I have determined the effect of several of the compounds hereinbefore named upon isolated sections of rabbit intestine, pregnant guinea pig uterus, and non-pregnant and virgin rat uteri, using the Magnus procedure for determining the antispasmodic value of pharmaceutical compounds. For example, methyl-di-(beta-cyclohexylethyl)-amine has an excellent relaxing quality on both guinea pig and rabbit intestine, repeatedly, in dilutions of 1–500,000 to 1–100,000, being approximately twice as potent in its action on smooth muscle tissue of the intestine and uterus as papaverine. It acts as an excellent antispasmodic on sections of intestine contracted by either a smooth muscle stimulant or a parasympathetic nerve stimulant. It abolishes the rhythmic movements of a pregnant guinea pig uterus, non-pregnant and virgin rat uteri, and relaxes uterine muscle which has been put into a state of tonic spasm. A particular advantage of this compound lies in the fact that it will act as an antispasmodic whether the pathological or physiological cause of spasm in smooth muscle be of muscular or neurogenic origin. The compound has a comparatively low toxicity. The antispasmodic values of the several compounds included within the scope of my invention vary over a considerable range and the foregoing statements with respect to methyl-di-(beta-cyclohexylethyl)-amine are offered only to illustrate one use to which some of the compounds may be put. They are valuable generally in the synthesis of other pharmaceutical products.

Other modes of applying the principle of my invention may be employed instead of those explained, change being made as regards the materials employed, provided the compounds stated by any of the following claims be produced.

I particularly point out and distinctly claim as my invention:

1. An alkyl-di-(cycloalkyl-alkyl)-amine.
2. A lower alkyl-di-(cyclohexyl-lower alkyl)-amine.
3. A tertiary amine having the following general structural formula:

wherein Y represents a lower alkyl radical, and X represents a cyclohexyl-lower alkyl group in which the alkyl residue is attached to the nitrogen atom.

4. Methyl-di-(beta-cyclohexylethyl)-amine.
5. Ethyl-di-(beta-cyclohexylethyl)-amine.
6. A compound selected from the group consisting of (a) the tertiary amines wherein two cycloalkyl-lower alkyl groups are attached by the alkyl residue to the nitrogen atom and the third substituent is a hydrocarbon group attached directly to the nitrogen atom and (b) the inorganic and organic carboxylic acid addition salts thereof.

7. A compound selected from the group consisting of (a) the tertiary amines having the formula—

wherein X represents a cycloalkyl-lower alkyl group and Y represents a hydrocarbon group selected from the class consisting of the aliphatic, aryl and araliphatic hydrocarbon radicals and (b) their inorganic and organic carboxylic acid addition salts.

8. A compound of the group consisting of inorganic acid and organic carboxylic acid addition salts of a tertiary amine containing three hydrocarbon groups attached to the nitrogen atom of which at least two such hydrocarbon groups are cycloalkyl-lower alkyl groups.

9. Methyl-di-(beta-cyclohexylethyl)-amine hydrochloride.

FREDERICK F. BLICKE.